United States Patent [19]

Bothwell

[11] 4,411,333
[45] Oct. 25, 1983

[54] MOTOR CYCLE FAIRING

[76] Inventor: P. W. Bothwell, "Meoncote", 114 Shipston Rd., Stratford-upon-Avon, Warwickshire, England

[21] Appl. No.: 321,201

[22] Filed: Nov. 13, 1981

[30] Foreign Application Priority Data

Nov. 15, 1980 [GB] United Kingdom ............... 8036742

[51] Int. Cl.³ ............................................ B62D 23/00
[52] U.S. Cl. .............................. 180/219; 280/281 B; 280/289 G; 296/78.1; 296/188
[58] Field of Search ............. 180/219; 280/289 E, 280/289 G, 289 S, 281 B, 751, 752; 296/188, 78.1

[56] References Cited

U.S. PATENT DOCUMENTS 3,088,539  5/1963  Mathues et al. ................. 280/752
3,843,155 10/1974  Foster .............................. 280/751
4,010,812  3/1977  Bothwell ...................... 280/281 B

FOREIGN PATENT DOCUMENTS 923595  2/1955  Fed. Rep. of Germany ..... 296/78.1
959349  3/1957  Fed. Rep. of Germany ... 280/281 B Primary Examiner—Joseph F. Peters, Jr.
Assistant Examiner—Kenneth R. Rice
Attorney, Agent, or Firm—Spencer, Kaye & Frank

[57] ABSTRACT

A motor cycle including a frame and a fairing mounted on the frame, the fairing comprising a molded shell formed to provide a bridge portion having two depending side portions which define with the bridge portion a cavity of generally inverted U-shape in cross-section, a hollow front portion extending upwardly and forwardly from the side portions and forwardly from the bridge portion, and a rear portion extending rearwardly from the brige portion. The side portions are formed with rearwardly directed faces carrying leg protectors each having an outer lip to restrain movement of a rider's legs outwardly from behind the protector. The cavity in the fairing shell is filled with foam plastics material. The fairing protects a fuel tank against impact, either having the tank housed in it or being formed with side panels which at least partially cover the sides of the tank.

16 Claims, 7 Drawing Figures

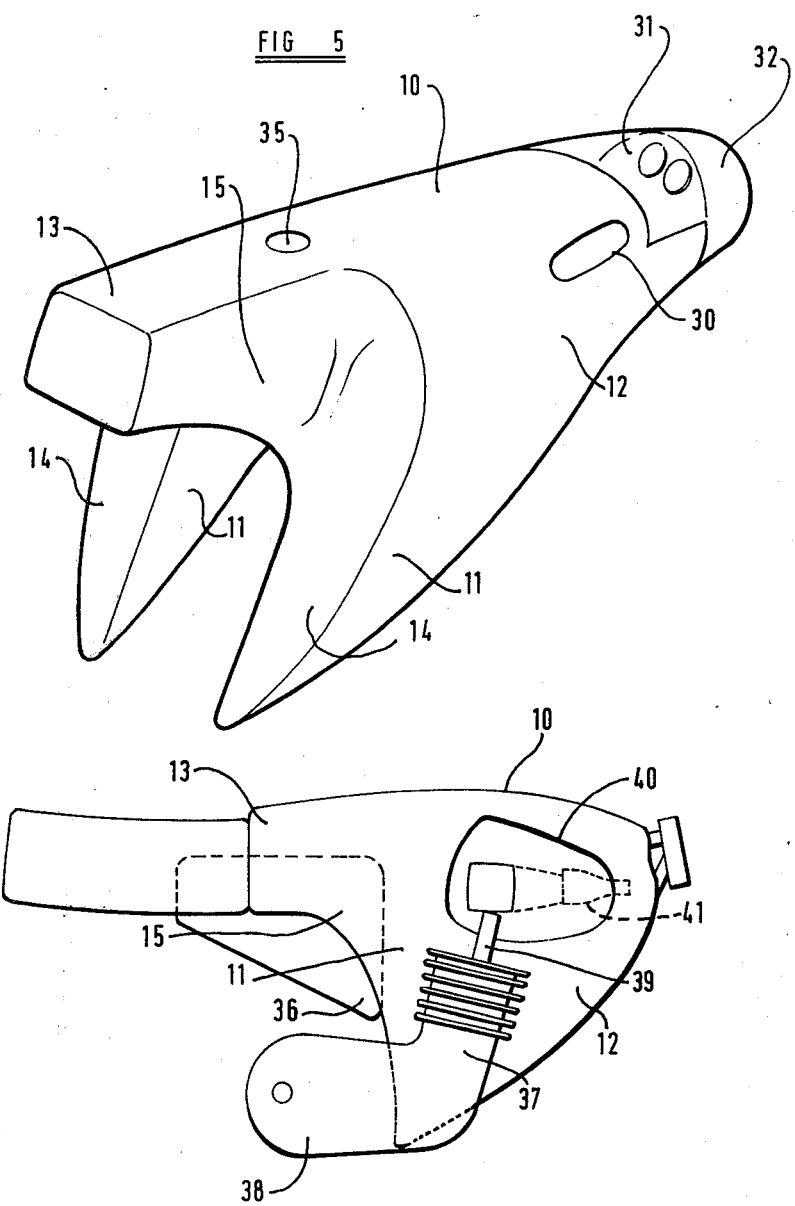

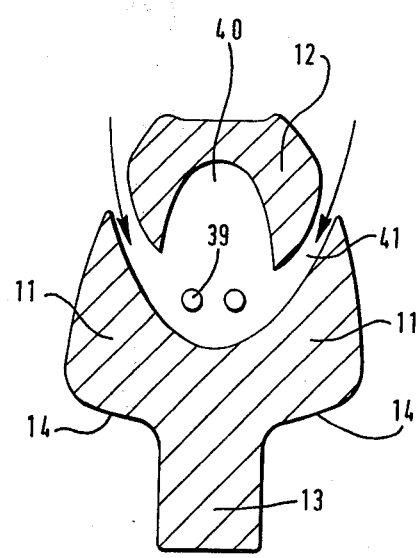

MOTOR CYCLE FAIRING

BACKGROUND OF THE INVENTION

This invention relates to motor cycles, scooters, mopeds and other like two-wheeled vehicles (hereinafter referred to generically as motor cycles).

SUMMARY OF THE INVENTION

The object of the invention is to provide an improved construction of fairing for a motor cycle.

According to the invention there is provided a motor cycle including a frame and a fairing mounted on the frame, the fairing comprising a body formed to provide a bridge portion having two depending side portions which define with the bridge portion a cavity of generally inverted U-shape in cross-section, a front portion extending upwardly and forwardly from the side portions and forwardly from the bridge portion, and a rear portion extending rearwardly from the bridge portion, the side portions being formed with rearwardly directed faces disposed in front of the positions to be occupied by a rider's legs.

Preferably the body of the fairing is adapted, when subjected to an impact, to absorb at least some of the energy of the impact. Thus, the body may comprise a moulded shell filled with a deformable material such as foam plastics.

A fairing of this basic form can be adapted to serve several different purposes. The fairing may be adapted to provide protection for the fuel tank of the motor cycle. It may provide a mounting for instruments and lamps, and it may be adapted to protect a rider's legs in a crash. The fairing may be formed to provide an air inlet and plenum chamber for the engine.

The fuel tank may be housed within the body of the fairing, being disposed in the position above the frame which it conventionally occupies in a motor cycle. Thus, the tank may extend through the bridge portion and into both the front and rear portions of the fairing. Alternatively, the tank may be mounted at a lower position within the confines of the frame and the fairing may be formed or provided with parts which at least partially cover the sides of the tank.

The front portion of the fairing may extend forwardly beyond the steering head of the front wheel of the motor cycle so that it encloses the head, the front portion being formed at opposite sides thereof with openings for the passage of handlebars connected to the head. The part of the front portion extending forwardly of the steering head may house a headlamp and instruments. Alternatively, the front portion may terminate rearwardly of the steering head.

The rearwardly directed faces of the side portions of the fairing preferably carry deformable protectors adapted to protect a rider's legs.

The front portion of the fairing may be formed with a plenum chamber in which the air intake or intakes of the engine are disposed, and with at least one air duct which opens forwardly of the front portion and communicates with the chamber.

BRIEF DESCRIPTION OF THE DRAWINGS

Specific embodiments of the invention will now be described, by way of example, with reference to the accompanying drawings, in which:

FIG. 5 is a perspective view of another form of motor cycle fairing embodying the invention, FIG. 6 is a longitudinal section through a further form of fairing embodying the invention, and FIG. 7 is a horizontal section through the fairing shown in FIG. 6.

DESCRIPTION OF THE PREFERRED EMBODIMENTS

Figure 1:
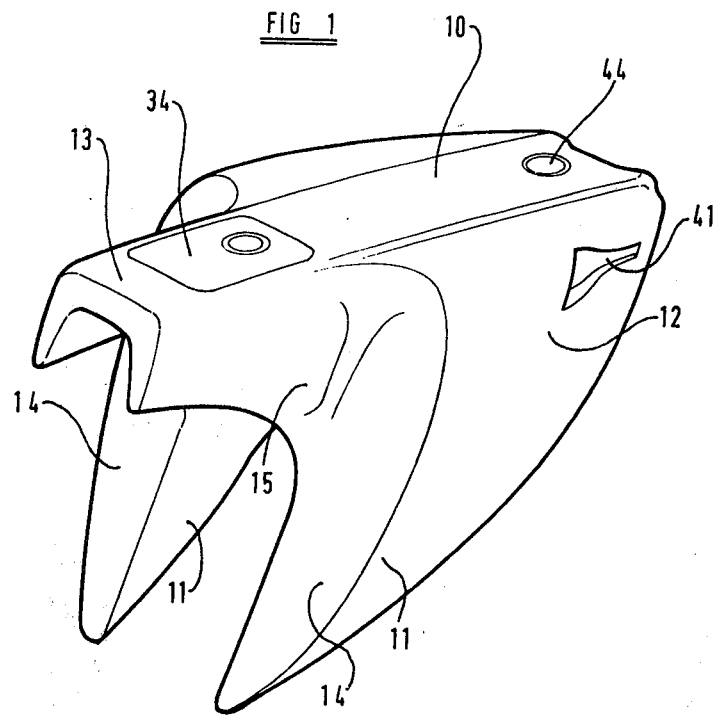
FIG. 1 is a perspective view of one form of motor cycle fairing embodying the invention.

In all of the embodiments illustrated in the drawings, the fairing comprises a moulded shell formed to provide a bridge portion 10 having two depending side portions 11 which define with the bridge portion a cavity of generally inverted U-shape in cross-section (see particularly FIG. 3), a hollow front portion 12 which extends upwardly and forwardly from the side portions and forwardly from the bridge portion, and a rear portion 13 which extends rearwardly from the bridge portion 10 and is generally of inverted U-shape in cross-section, the side portions 11 being formed with rearwardly directed faces 14 which, when the fairing is incorporated in a motor cycle, are disposed in front of the positions to be occupied by a rider's legs. The fairing is also formed with generally triangular shaped side panels 15 extending between the sides of the rear portion 13 and the inner edges of the faces 14.

Figure 2:
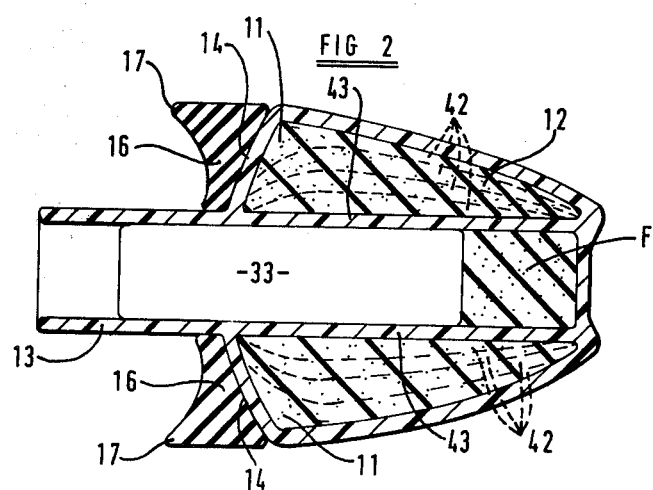
FIG. 2 is a horizontal section through the fairing shown in FIG. 1.

The faces 14 carry deformable leg protectors 16 as shown in FIG. 2 (the protectors being omitted in the other views). These protectors are provided along their outer edges with rearwardly extending, smoothly contoured lips 17 which act to restrain movement of a rider's legs outwardly from behind the protectors. Thus, the lips prevent the legs splaying outwardly, which could cause injury in an accident. The lips are deformable to absorb at least some of the energy of an impact, and preferably each lip is substantially non-deformable under an outwards impact but deformable to absorb energy of a forwards impact. The lips are formed integrally with the protectors.

Each leg protector may comprise a shell of a semi-rigid material such as rubber or suitable plastics material which is filled with a deformable material such as foam plastics and is constructed to deform in the manner described, the rearwardly directed face of the protector and the inner face of its lip being covered with a soft padding such as foam rubber with a leather or sheet plastics covering.

Figure 4:
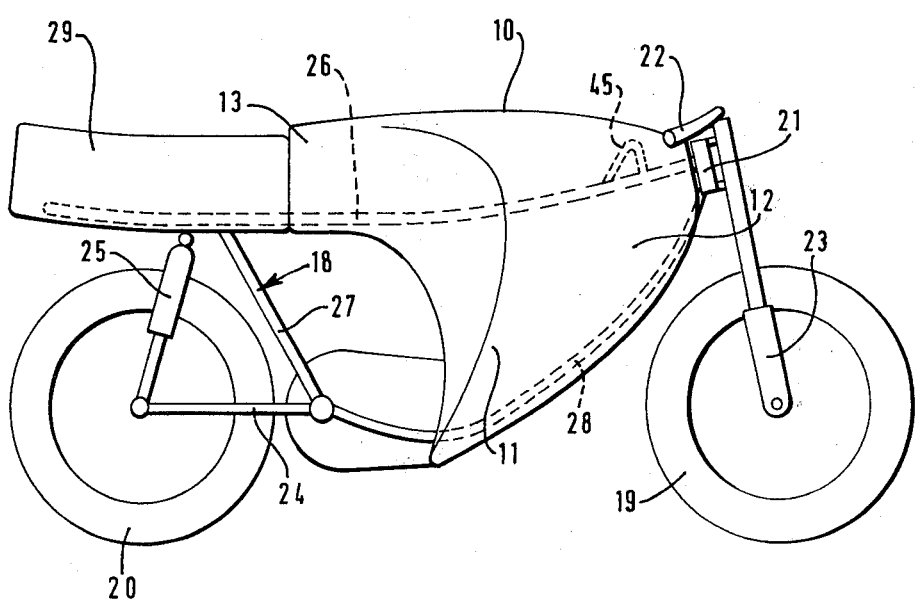
FIG. 4 shows the fairing incorporated in a motor cycle.

The fairing is incorporated in a motor cycle as shown in FIG. 4. The motor cycle comprises a frame 18 mounted on a front wheel 19 and a rear wheel 20. The front wheel is carried by a steering head 21 having handlebars 22 and two depending forks incorporating suspension units 23 for the wheel. The rear wheel is carried by two swinging arms 24 and is connected to the frame by two suspension units 25.

The frame 18 includes one or two longitudinally extending members 26 and further members 27 and 28, the steering head 21 being supported by the front ends of the members 26 and 28.

The fairing is mounted on the frame 18 with the longitudinally extending member or members 26 extending through the downwardly facing channel defined by the rear portion 13, the bridge portion 10 with the side portions 11, and the front portion 12. A seat 29 is mounted on the frame adjacent to the rear portion 14 of the fairing, the seat and the fairing together providing a smoothly contoured upper surface. The front portion 12 of the fairing is also smoothly contoured aerodynamically.

In the embodiments shown in FIGS. 1 to 4 and FIGS. 6 and 7, the fairing is relatively short and terminates rearwardly of the steering head 21.

In the FIG. 5 embodiment, the front portion 12 of the fairing extends forwardly beyond the steering head 21 so as to enclose the head, the front portion being provided at opposite sides thereof with slots 30 through which the handlebars 22 extend. The part of the front portion which extends forwardly from the steering head is formed with a recess closed by a transparent cover and having mounted in it, an instrument panel 31 which may include, for example, a speedometer, a tachometer, an ammeter and a temperature gauge. The front end of the fairing also incorporates a headlamp 32.

The fairing in the embodiments shown in FIGS. 1 to 4 and FIG. 5 houses a fuel tank 33 which extends through the bridge portion 10 into the front and rear portions 12 and 13. The fuel tank, which is of metal, is therefore in the position which it conventionally occupies in a motor cycle but it is protected against impact by the fairing. The longitudinally extending members 26 of the frame extend beneath the fuel tank.

In the embodiment of FIGS. 1 to 4, the upper face of the fairing is provided with a hinged cover 34 providing access to the filler cap of the fuel tank. In the FIG. 5 embodiment, the upper face of the fairing is formed with an aperture 35 to accommodate the filler cap of the fuel tank.

In the embodiment shown in FIGS. 6 and 7, the motor cycle has a fuel tank 36 which is mounted at a lower position within the frame. In this case, the side panels 15 partially cover the sides of the fuel tank so as to protect it against side impacts.

In the embodiment of FIGS. 6 and 7, the engine 37, which is combined with a gearbox 38, is mounted in a position in which it is inclined to the vertical (or it may be vertical). The air intake for the carburettor or fuel injection system of the engine is shown at 39 and is disposed between the inlet and exhaust valves. The air intake is disposed in a chamber 40 formed in the front portion 12 of the fairing and two forwardly opening "NACA" air ducts 41 formed in the front portion communicate with this chamber. These ducts are also shown in FIG. 1. Thus, when the motor cycle is in motion, air enters the ducts and the chamber 40 acts as a plenum chamber in which a body of still air is created for supply to the air intake of the engine.

Figure 3:
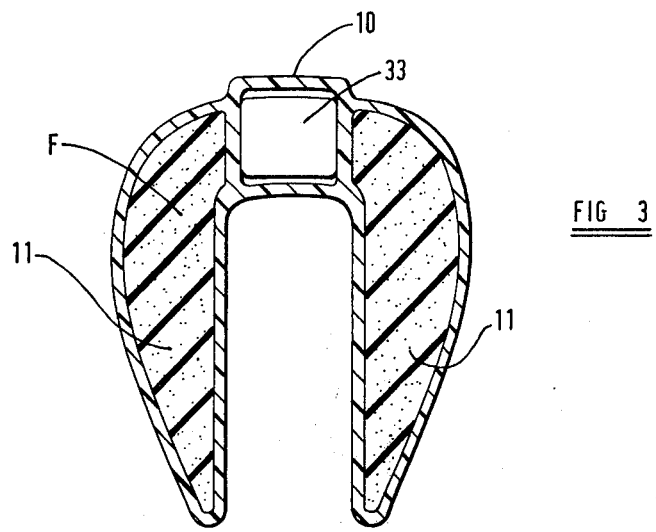
FIG. 3 is a vertical section through the fairing shown in FIG. 1.

The moulded shell of the fairing may be formed from a plastics material, for example polycarbonate such as that sold under the Trade Mark "LEXAN", or glass fibre. A plastics shell may be injection moulded or it may comprise a number of vacuum-formed sections. The shell may be double-walled. The shell is filled with a foam plastics material F and, as shown in FIGS. 2 and 3, parts of the filling are completely enclosed by the shell. Thus, the fairing is adapted to deform under an impact and thereby absorb at least some of the energy of the impact.

As shown in dotted lines in FIG. 2, the foam plastics filling in the cavity in the shell may be provided in the form of layers 42 of progressively increasing densities from the side faces of the front portion 12 inwardly towards the inner parts of this portion. The fairing therefore provides a progressively increasing resistance to an impact, the outer layer deforming more readily than the next layer and so on. If desired, sheet plastics webs may be provided between the layers, the foam plastics simply being injected into the compartments between the webs. The webs may be fixed to the shell of the fairing at both their front and rear ends or only at their front ends so that they have "floating" rear ends.

The fairing may have internal ribs or reinforcing plates, for example webs 43 at opposite sides of the fuel tank as in the embodiment of FIGS. 1 to 4.

The fairing can be secured to the motor cycle frame in various ways. Preferably it is attached to the frame 18 behind the steering head 21, the fairing being provided with a removable cover 44 providing access to the attachment means. In another arrangement the side panels 15 are secured by bolts to a tube extending between them and located behind the engine. The fairing may be secured to appropriate parts of the engine and gearbox.

As shown in dotted lines in FIG. 4, the or each longitudinally extending member 26 of the frame may have an upwardly extending projection 45 which is located in a complementary recess in the fairing. The or each projection, which may be a tubular member, therefore keys the fairing to the frame and it is not necessary to bolt the fairing to the frame. A particular advantage of this arrangement is that it prevents the fairing being pushed rearwardly relative to the frame in a crash.

The fairing is formed as an integral structure separate from the frame. The integrity of the frame is not affected should the fairing be damaged in a crash.

I claim:

1. A motor cycle including a frame and a fairing mounted on the frame, the fairing comprising a body formed to provide a bridge portion having two depending side portions which define with the bridge portion a cavity of generally inverted U-shape in cross-section, a front portion extending upwardly and forwardly from the side portions and forwardly from the bridge portion, and a rear portion extending rearwardly from the bridge portion, the side portions being formed with rearwardly directed faces disposed in front of the positions to be occupied with a rider's legs and wherein the body comprises a shell filled with a relatively deformable material and completely enclosing the deformable material.

2. A motor cycle as claimed in claim 1 wherein the shell of the fairing contains layers of foam plastics material of progressively increasing densities from the outer side faces of the front portion inwardly towards the inner part of the front portion.

3. A motor cycle as claimed in claim 2 wherein there are interposed between adjacent ones of said layers webs of solid plastics material.

4. A motor cycle as claimed in claim 1 wherein a fuel tank is housed within the body of the fairing.

5. A motor cycle as claimed in claim 4 wherein the fuel tank extends through the bridge portion of the fairing into the front and rear portions.

6. A motor cycle as claimed in claim 1 wherein the body of the fairing is provided with panels extending between the sides of the rear portion and the inner sides of the rearwardly directed faces.

7. A motor cycle as claimed in claim 6 wherein a fuel tank is mounted within the confines of the frame with the side panels of the fairing at least partially covering the sides of the tank.

8. A motor cycle as claimed in claim 1 wherein the front portion of the fairing terminates rearwardly of a steering head for a front wheel carried by the frame.

9. A motor cycle as claimed in claim 1 wherein the front portion of the fairing extends forwardly beyond a steering head for a front wheel carried by the frame so that it encloses the head, the front portion being formed at opposite sides thereof with openings for the passage of handlebars connected to the steering head.

10. A motor cycle as claimed in claim 1 wherein the rearwardly directed faces of the side portions of the fairing carry deformable leg protectors.

11. A motor cycle as claimed in claim 10 wherein each leg protector is provided along its outer edge with a rearwardly extending, smoothly contoured lip arranged to restrain movement of a rider's leg outwardly from behind the protector.

12. A motor cycle as claimed in claim 11 wherein the lip of each leg protector is deformable to absorb at least some of the energy of an impact.

13. A motor cycle as claimed in claim 12 wherein each lip is substantially non-deformable under an outwards impact but deformable to absorb energy of a forwards impact.

14. A motor cycle as claimed in claim 1 wherein the fairing straddles at least one upper, longitudinally extending member of the frame.

15. A motor cycle as claimed in claim 14 wherein the fairing is keyed to the longitudinally extending member of the frame by an upwardly extending projection on the member engaged in a recess in the fairing.

16. A motor cycle as claimed in claim 1 further comprising an engine having an air intake, a plenum chamber defined by said body and communicating with the air intake and a duct defined by the body and leading to the plenum chamber from the outside of the body.

* * * * *